United States Patent [19]

Minami et al.

[11] Patent Number: 4,977,551

[45] Date of Patent: Dec. 11, 1990

[54] OPTICAL DISK TRACKING CONTROL SYSTEM AND METHOD HAVING NORMALIZED TRACKING ERROR CONTROL SIGNAL

[75] Inventors: Akira Minami, Yokohama; Shigeyoshi Tanaka, Kawasaki, both of Japan

[73] Assignee: Fujitsu Limited, Kawasaki, Japan

[21] Appl. No.: 166,490

[22] Filed: Mar. 10, 1988

[30] Foreign Application Priority Data

Mar. 12, 1987 [JP] Japan .................................. 62-57777

[51] Int. Cl.$^5$ .............................................. G11B 7/95
[52] U.S. Cl. .............................. 369/44.25; 369/44.32; 369/44.36; 369/54
[58] Field of Search ...................... 369/44–46, 369/53–54, 58, 106, 124, 44.25–44.27, 44.29, 44.32, 44.35, 44.36; 250/201, 202, 201.1, 201.5

[56] References Cited

U.S. PATENT DOCUMENTS

| | | | |
|---|---|---|---|
| 4,417,331 | 11/1983 | Takaoka et al. | 369/44 X |
| 4,446,545 | 5/1984 | Van Dijk | 369/44 |
| 4,587,644 | 5/1986 | Fujiie | 369/44 |
| 4,661,942 | 4/1987 | Yoshimoto et al. | 369/44 |
| 4,689,779 | 8/1987 | Hayashi et al. | 369/44 |
| 4,775,965 | 10/1988 | Yoshimoto et al. | 369/44 |
| 4,775,966 | 10/1988 | Miura et al. | 369/44 |
| 4,807,214 | 2/1989 | Getrener | 369/44 X |
| 4,823,330 | 4/1989 | Arter et al. | 369/54 X |

*Primary Examiner*—Aristotelis M. Psitos
*Assistant Examiner*—W. R. Young
*Attorney, Agent, or Firm*—Staas & Halsey

[57] ABSTRACT

A tracking servo control system of an optical disk system produces a tracking control output signal for control of a tracking actuator which is adjusted to enable accurate positioning of a focussed light beam spot of the optical disk system at the center of a selected groove of a disk, for a variety of optical disks having various groove shapes. The output signal of a light receiver responsive to reflected image of the light beam spot focussed on the disk is processed to produce a tracking error signal:Y and a sum signal:X which are processed by a correction circuit for calculating the value:

$$E = \frac{Y \cdot Z}{X}$$

where Z is a correction factor, the value of which is adjusted, to normalize the calculated value:E, in accordance with the peak detected value of E.

18 Claims, 8 Drawing Sheets

OPTICAL DISK TRACKING CONTROL SYSTEM AND METHOD HAVING NORMALIZED TRACKING ERROR CONTROL SIGNAL

BACKGROUND OF THE INVENTION

1. Field of the Invention

The present invention relates to an optical disk system. More particularly, it relates to an apparatus for adjusting a tracking signal used for a tracking servo control to ensure stable operation of the tracking servo control for a variety of different optical disks.

2. Description of the Related Art

Both focus servo control and a tracking servo control must be carried out in an optical disk system. The focus servo control adjusts the position of an object lens to focus a beam emitted from a laser diode onto a track of an optical disk, so that any beam displacement at the track caused by an eccentricity in the motion of the optical disk and/or any deformation of the optical disk can be compensated. The tracking servo control adjusts the position of the read/write head to ensure that the head follows the track, to obtain a fine, or precise control of the position of the head.

Various different optical disks are used in an optical disk system and the tracking servo control is effected by using a light reflected from a groove formed in the optical disk. However, this reflected light is varied in response to the change of an exposure light used for data read and data write operations, dispersion of the groove shape due to differences between manufacturing lots and differences in manufacturing techniques, and differences in a groove shape, for example, a difference between a U-shaped groove and a V-shaped groove. In a prior art tracking servo control system, compensation for a differing reflection light due to differences between a write data exposure light and a read data exposure light is known, since the tracking servo control system receives a write mode signal and a read mode signal. However, in the prior art tracking servo control system, compensation for the dispersion of the groove shape is not yet practiced, and as a result, a fine or precise position control can not be fully carried out. In addition, compensation for differences in the groove shape is not practiced, and as a result, the optical disk system of the prior art can not use different types of optical disks having various groove shapes.

SUMMARY OF THE INVENTION

An object of the present invention is to provide an optical disks system which adjust for dispersion of a groove shape.

Another object of the present invention is to provide an optical disk system usable for a variety of different optical disks having various groove shapes.

According to the present invention, there is provided an optical disk system including an optical disk provided with a plurality of grooves for a data read and write operations, and an optical head having an object lens, a light source, a light receiver, an optical system provided among the light source, the object lens, and the light receiver for directing a light emitted from the light source onto the object lens and for introducing a light from the groove to the light receiver, a focus actuator for moving the object lens to focus the light from the object lens on the groove, and a track actuator for moving the object lens to position the light from the object lens at the center of the groove. The optical disk system also includes a focus servo portion for driving the focus actuator, and a tracking servo portion for driving the tracking actuator, and having a circuit for receiving light from the light receiver and generating a tracking error signal:Y on the basis of the received light, a circuit for receiving the light from the light receiver and generating a sum signal:X of the received light, a correction circuit for calculating a value: $E=(Y \cdot Z)/X$, where Z is a correction factor, and a circuit for phase-adjusting the calculated value. The optical disk system further includes a circuit for detecting a peak of the value calculated at the correction circuit, and a unit for controlling the focus servo portion and the tracking servo portion, and for adjusting a tracking signal. The control unit gives the correction factor:Z to normalize the calculated value:E, so that the tracking servo control is carried out by using the normalized tracking error signal:E.

The adjustment of the correction factor:Z for normalizing the value:E calculated at the correction circuit may be carried out by successively increasing or decreasing the correction factor until the peak of the calculated value:E lies within a predetermined range. Alternatively, the adjustment of the correction factor:Z for normalizing the value:E calculated at the correction circuit may be carried out by calculating $Z=W/Ws$, where W is a read of the peak of the calculated value:E, and Ws is a predetermined normalized amplitude.

The adjustment of the tracking signal may be carried out just after the energization of the focus servo control and prior to the energization of the tracking servo control. Alternatively, the adjustment of the tracking signal may be carried out periodically in a normal operation.

The tracking servo portion may include a digital-to-analog converter receiving the digital correction factor from the control unit and converting it to an analog correction factor to be supplied to the correction circuit. The tracking error signal generation circuit, the sum reflection light signal generation circuit and the correction circuit may be formed by analog circuits. The peak detection circuit may include an analog peak detection circuit receiving the output from the correction circuit and holding a maximum value, and an analog-to-digital converter converting the analog maximum value held at the peak detection circuit to a digital value and supplying the same to the control unit. The maximum value held at the peak detection circuit can be reset by the control unit.

The correction circuit may include two FET's having the same drain-source resistance and gates which are commonly connected, a first terminal of the first FET receiving the track error signal:Y, a first terminal of the second FET receiving the sum light signal:X, a second operational amplifier connected to a second terminal of the second FET at an inverted input terminal, another non-inverted input terminal thereof being grounded, an output thereof being connected to the common FET gate connected point, a resistor receiving the correction factor:Z at a terminal thereof and another terminal being connected to the connected point of the second terminal of the second FET and the input terminal of the second operational amplifier, a first operational amplifier having the same operational characteristic as the second operational amplifier and connected to another terminal of the first FET at an inverted input terminal, another non-inverted input terminal being grounded, and a feedback resistor connected between the inverted input terminal and an output of the first operational amplifier, and having the same resistance as the resistor.

The light receiver may comprise a four-division light receiver. Or, the light receiver may comprise a two-division light receiver.

The optical disk may be provided with a plurality of reflection type semi V-shaped grooves, or, with a plurality of transparent type semi V-shaped grooves. Alternatively, the optical disk may be provided with a plurality of reflection type U-shaped grooves, or with a plurality of transparent type U-shaped grooves.

The control unit may comprise a microprocessor unit.

BRIEF DESCRIPTION OF THE DRAWINGS

Other objects and features of the present invention will be described in more detail with reference to the accompanying drawings, in which.

DESCRIPTION OF THE PREFERRED EMBODIMENT

Before describing the preferred embodiment of the present invention, an optical disk drive system and a prior art tracking servo control system incorporated therein will be described to provide an easy understanding of an optical disk control and to distinguish the differences between the prior art tracking servo control system and the embodiment of the present invention.

Figure 1:
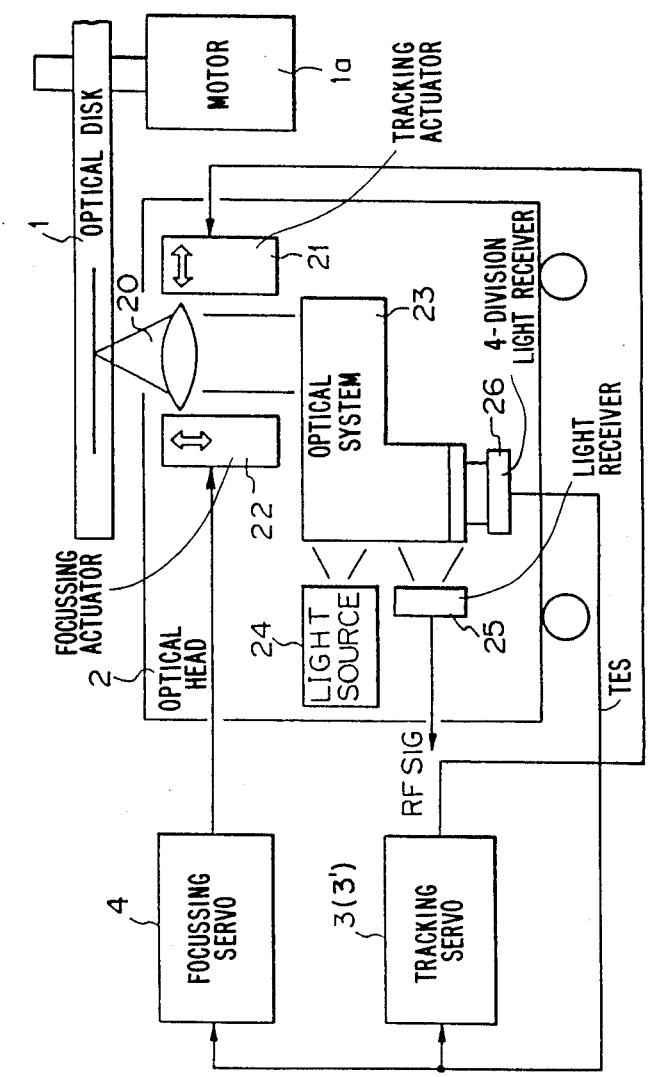
FIG. 1 is a block diagram of an optical disk drive system to which the present invention is applied.

Referring to FIG. 1, an optical disk drive system includes an optical disk 1 rotated by a motor 1a, an optical head 2, a tracking servo portion 3', and a focusing servo portion 4. The optical head 2 includes an object lens 20, a tracking actuator 21 having a drive coil, a focus actuator 22 having a drive coil, an optical system 23, a light source 24 having a semiconductor laser diode, a light receiver 25, and a four-division light receiver 26.

First, in a seek control mode, the optical head 2 is moved to a desired track on the optical disk 1. Second, in a fine position control mode, the optical head 2 is finely positioned at the desired track. During the fine position control mode, reading of data from or writing of data onto the desired track can be carried out. To carry out the data read or the data write, a light emitted from the light source 24 in the optical head 2 is led to the object lens 20 through the optical system 23 and focused on a groove of the track in the optical disk 1. A beam spot focused by the object lens 20 and incident on the groove is reflected, and the reflected beam spot is received at the optical system 23 through the object lens 20. The beam spot received at the optical system 23 is supplied to the light receiver 25 to generate a reproduction signal RF. The reproduction signal is used for a data read and level control operations. Also, the beam spot received at the optical system 23 is supplied to the four-division light receiver 26 which output four electrical signals corresponding to the received light signals and which are used for generating a tracking error signal TES. The generation of the tracking error signal TES will be described later.

The optical disk 1 is provided with a large amount of grooves, forming tracks or pits, in a radial direction. A pitch between adjacent grooves is usually 1.6 μm. As the pitch is very small, a small eccentricity in the rotation of the disk may result in a large track displacement. In addition, the optical disk 1 is not perfectly even in the plane thereof, and this results in an undulating motion of the optical disk 1, which further displace the focus of the beam spot incident at the groove. Note, the beam spot must be focused on the groove within a range of 1 μm.

The focus servo portion 4 receives the tracking error signal TES from the four-division light receiver 26 and adjusts the focus position of the object lens 20 by moving the object lens 20 in a vertical direction, by means of the focus actuator 22 connected to the object lens 22. The tracking servo portion 3' also receives the tracking error signal TES from the four-division light receiver 26 and adjusts the track position of the object lens 20 by moving the object lens 20 in a horizontal direction, through the tracking actuator 21, in response to the tracking error signal TES.

Figure 2A:
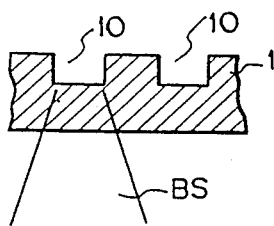
FIG. 2a and 2b are graphs explaining the beam focus in FIG. 1.
Figure 2B:
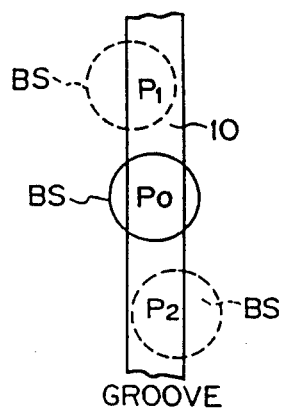

The operation of the tracking servo control will now be described in detail. The tracking servo control uses the diffraction of the beam spot BS by the groove 10 of the optical disk 1, as shown in FIG. 2a. Namely, the reflection light quantity distribution at the four-division light receiver 26 is varied in response to the position in the groove 10 of the beam spot BS, and thus a change of the light diffraction therefrom occurs as shown in FIG. 2b. The tracking error signal TES is obtained by using the change of the light diffraction. The four-division light receiver 26 consists of four light sensors a, b, c, and d, and outputs four electrical signals La, Lb, Lc, and Ld corresponding to the received light signals, respectively. The tracking error signal TES is defined by the following formula:

$$TES = (La + Ld) - (Lb + Lc) \tag{1}$$

Figures 3A, 3B, 3C:
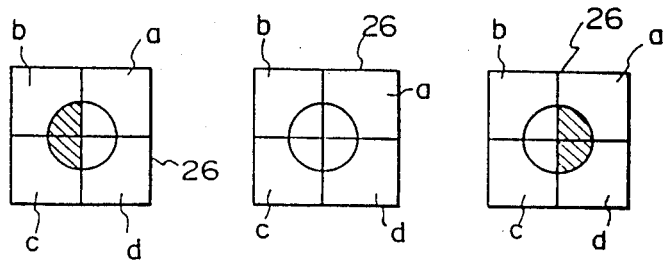
FIGS. 3a to 3c are views explaining a detection of a light reflected from a groove of an optical disk in connection with FIGS. 2b.
Figure 4:
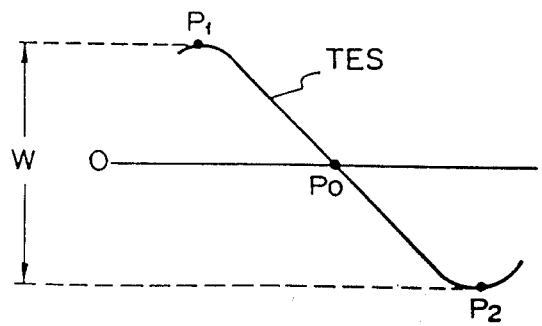
FIG. 4 is a graph explaining the generation of a tracking error signal in FIG. 1.

When the center of the beam spot BS is at a position $P_1$ shown in FIG. 2b, two sensors $a$ and $d$ receive the reflected light as shown in FIG. 3a. As a result, the tracking error signal TES is a positive maximum value as shown in FIG. 4, in accordance with the formula (1). When the center of the beam spot BS is at a position $P_0$ as shown in FIG. 2b, the tracking error signal TES is 0

(zero) as shown in FIG. 4. Conversely, when the center of the beam spot BS is at a position P2 as shown in FIG. 2b, the tracking error signal TES is a negative minimum value as shown in FIG. 4. Accordingly, by using the tracking error signal TES, the tracking servo portion 3' drives the object lens 20 by using the tracking actuator 21 to place the center of the beam spot BS at the center of the groove 10 of the optical disk 1.

Figure 5:
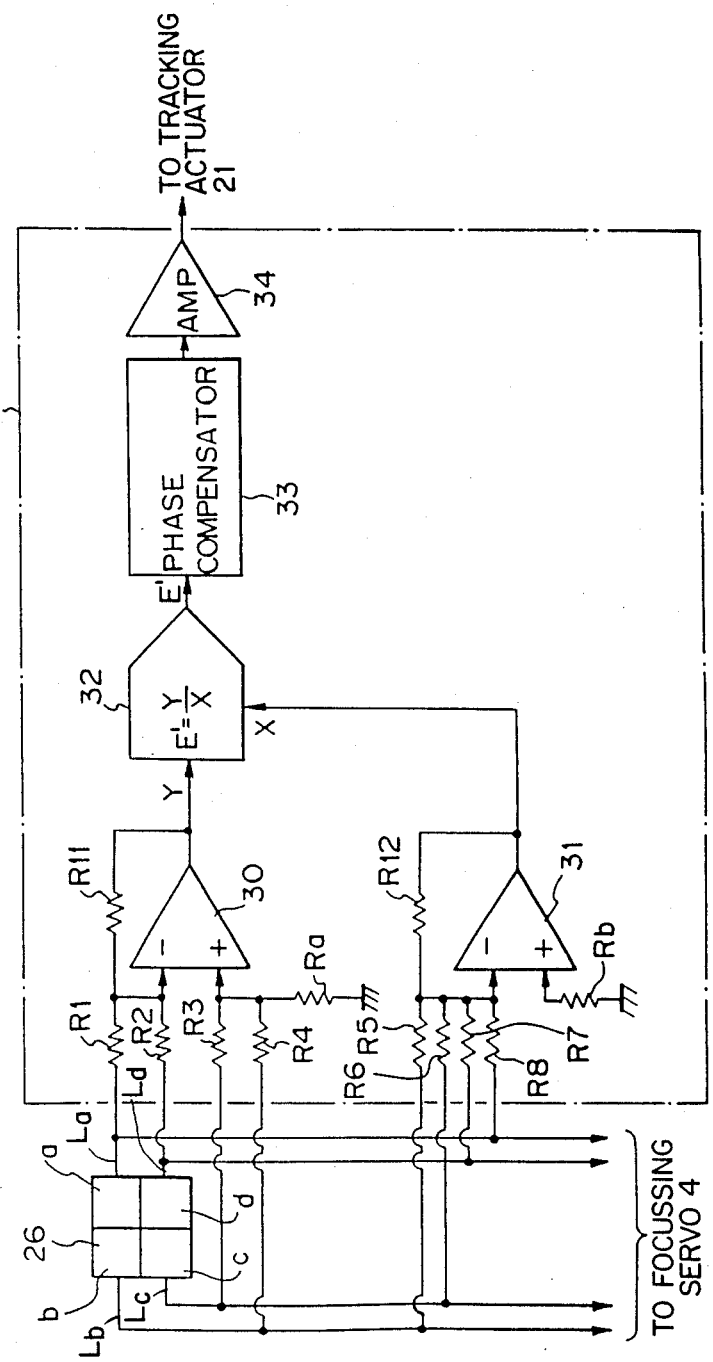
FIG. 5 is a circuit diagram of a prior art tracking servo control system.

Referring to FIG. 5, the prior art tracking servo portion 3' will be described. The track servo portion 3' includes input resistors R1 to R8, bias resistors Ra and Rb, an operational amplifier 30 functioning as a subtractor, an operational amplifier 31 functioning as an adder, feedback resistors R11 and R12, a divider 32, a phase compensator 33, and a power amplifier 34. The operational amplifier 30 receives the four light sensed signals La, Lb, Lc, and Ld from the four-division light receiver 26 and outputs the tracking error signal TES, shown as output signal Y in FIG. 5 in accordance with the formula (1). The operational amplifier 31 receives the four light sensed signals La, Lb, Lc, and Ld and outputs a sum of reflected light signals in accordance with the following formula:

$$X = La + Lb + Lc + Ld \quad (2)$$

The divider 32 divides the tracking error signal Y by the sum reflection light signal X and outputs an automatic gain controlled value E. Namely, the automatic gain control or the adjustment of the amplitude of the track error signal TES (or Y), enables an even control of the difference in intensity of the exposed beam spot when the data read and the data write operations are carried out and a variation in the reflection of the beam spot exists. The phase compensator 33 compensates for the phase of the automatic gain controlled signal E'. The power amplifier 34 amplifies the compensated and automatic gain controlled signal to an appropriate level for driving the tracking actuator 21, and the object lens 20 is moved to position the center of the beam spot BS therefrom at the center of the groove 10.

Figure 6A:
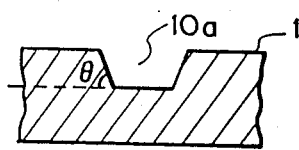
FIGS. 6a and 6b are a sectional view of a V-shaped groove and a graph of a tracking error signal generated by a light reflected from the V-shaped groove.
Figure 6B:
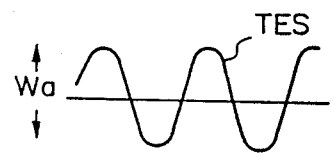
Figure 7A:
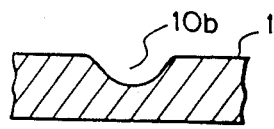
FIGS. 7a and 7b are a sectional view of a U-shaped groove and a graph of a tracking error signal generated by a light from the U-shaped groove.
Figure 7B:
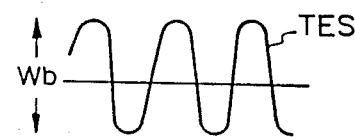
Figure 8:
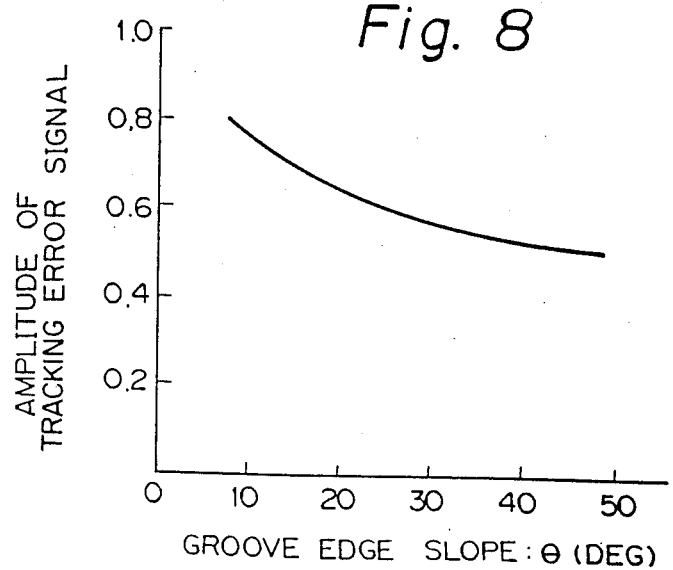
FIG. 8 is a graph representing a relationship between a groove .edge slope and a tracking error signal.

The optical disks used in the optical disk system are different: Namely, grooves in one optical disk type have a semi V-shape with a slope θ (degree) as shown in FIG. 6a, and grooves in another optical disk type have a U-shape with a smooth slope as shown in FIG. 7a. FIG. 6b shows a wave form of a tracking error signal TES when the optical disk having the groove 10a as shown in FIG. 6a is used. FIG. 7b shows a wave form of a tracking error signal TES when the optical disk having the groove 10b as shown in FIG. 7a is used. As can be seen by comparing FIGS. 6b and 7b, the amplitudes Wa and Wb and the respective frequencies are different. In addition, the amplitudes are varied by the respective slopes of the semi V-shaped groove or the U-shaped groove. FIG. 8 shows a change of amplitude caused by a change of a groove edge slope. The ordinate in FIG. 8 shows a normalized amplitude of a tracking error signal. Furthermore, the amplitude is varied in response to the depth and the width of a groove. Optical disks are subjected to a dispersion of the groove shape due to a difference in manufacture, and/or variations in production conditions. This dispersion varies the amplitude and the frequency of the tracking error signal.

An optical disk system should be able to handle a variety of different optical disks. However, the sum of the reflected light obtained at the operational amplifier 31 shown in FIG. 5 does not show such differences. Accordingly, the tracking servo control system can not adjust for the difference in amplitude of a tracking error signal, in spite of the execution of the automatic gain control. As a result, the servo gain may be varied and an out of servo scope and/or an abnormal oscillation of an optical head may occur.

Figure 9:
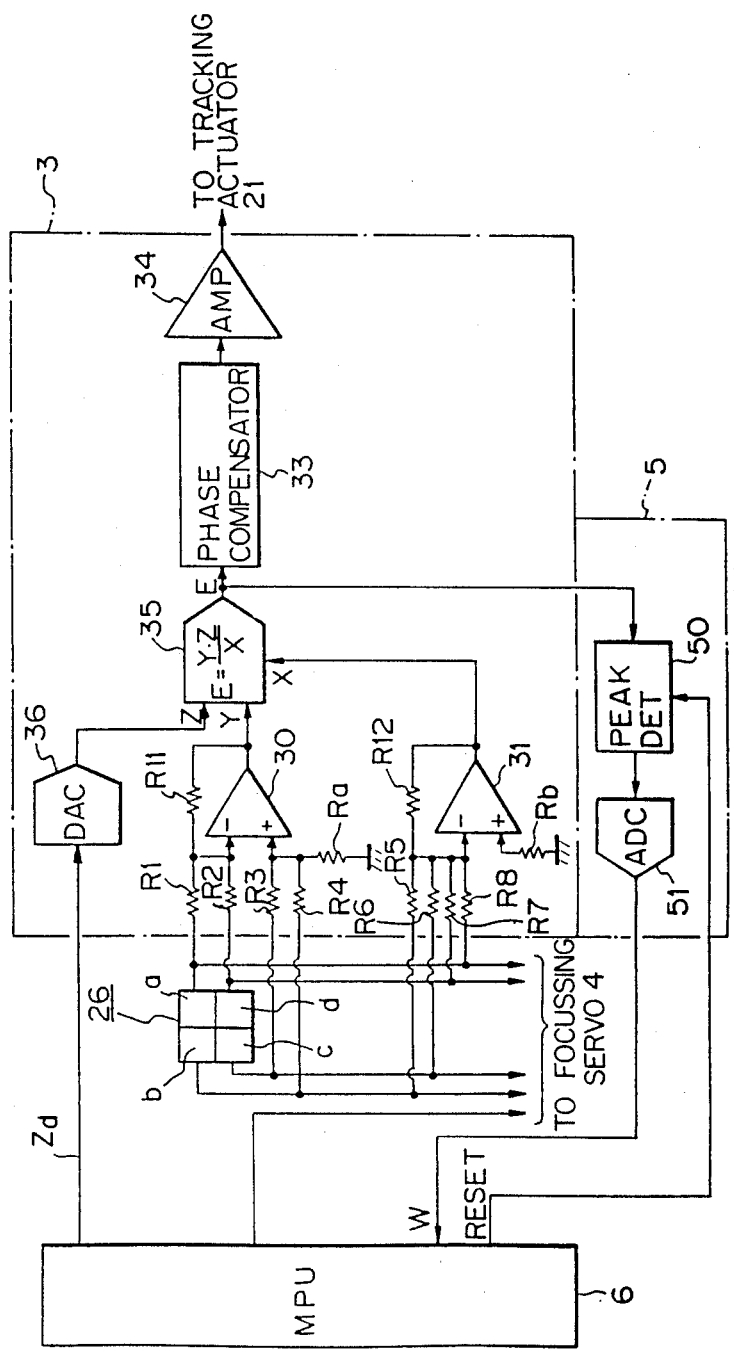
FIG. 9 is a circuit diagram of an embodiment of a tracking servo control system in accordance with the present invention.

Referring to FIG. 9, an embodiment of the tracking servo control system of the invention will now be described.

The tracking servo control system comprises a microprocessor unit (MPU) 6 such as an INTEL-8031, a tracking servo portion 3, a peak detection portion 5, and as in FIG. 1, the four-division light receiver 26, and the tracking actuator 21. The MPU 6 is used for focus servo control, tracking servo control, and read/write operations. The tracking servo portion 3 is provided with a digital-to-analog converter (DAC) 36 in addition to the tracking servo portion 3' shown in FIG. 5. The divider 32 shown in FIG. 3 is replaced by a correction circuit 35. Other circuits of the track servo portion 3 shown in FIG. 9 are the same as those of the tracking servo portion 3' shown in FIG. 5. The peak detection portion 5 comprises a peak detector 50 and an analog-to-digital converter (ADC) 51. The peak detector 50 detects the peak of the output E of the correction circuit 35, and the ADC 51 converts the peak analog value from the ADC 51 into a peak digital value.

The correction circuit 35 calculates an amplitude normalized and corrected tracking error signal E in accordance with the following formula:

$$E = \frac{Y \cdot Z}{X} \quad (3)$$

where,

X denotes a sum of all reflected light obtained at the operational amplifier 31 in accordance with the formula (2), Y denotes a tracking error signal TES, obtained at the operational amplifier 30 in accordance with the formula (1), and Z denotes a correction factor supplied from the MPU 6 through the DAC 36.

Figure 10:
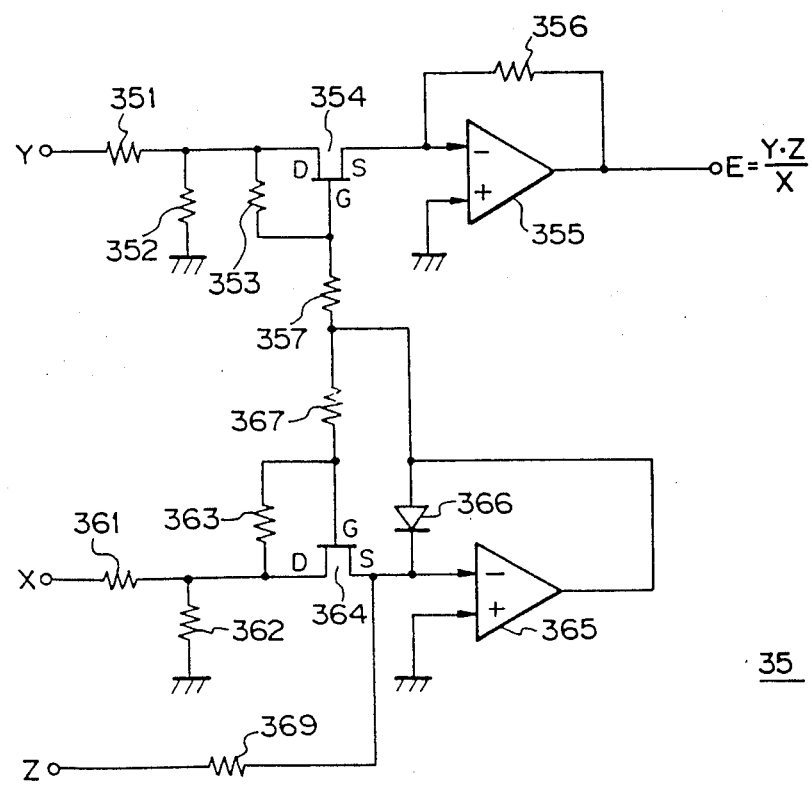
FIG. 10 is, a specific circuit diagram of an adjustment circuit shown in FIG. 9.

FIG. 10 shows a specific circuit diagram of the correction circuit 35. The correction circuit 35 includes input resistors 351, 361, and 369, bias resistors 352 and 362, FET's 354 and 364, bypass resistors 353 and 363, series resistors 357 and 367, operational amplifiers 355 and 365, and a diode 366. The correction circuit 35 uses the characteristic that a resistance $R_{DS}$ between a drain and a source of an FET is varied in response to the applied gate voltage. The operational amplifier 365 operates to maintain the applied input voltage which is applied to the inverted input terminal of the amplifier 365 at zero volt by negative feedback of the output therefrom to a gate of the FET 364. The FET's 354 and 364 are identical, and thus both FET's have the same source-drain resistance $R_{DS}$ when the same gate voltage is supplied thereto. When an input Z of −1 V is supplied to the resistor 369 having a resistance R1 and an input X of +1 V is supplied to the drain of the FET 364 through the resistor 361, the operational amplifier 365 controls the gate of the FET 364 to maintain the input voltage applied to the inverted input terminal thereof at zero volt; namely, operational amplifier 365 functions to make the drain-source resistance $R_{DS}$ FET 364 equal to the resistance R1 of the resistor 369. When an input Y of +1 V is supplied to the drain of the FET 354 and the resistance R2 of the resistor 356 is equal to the resistance R1, the drain-source resistance $R_{DS}$ of the FET 354 becomes equal to the resistance R2. As the drain-source resistance $R_{DS}$ of the FET 354 is equal to the resistance R2, the gain of the operational amplifier 355 becomes −1, thereby to produce an output E of −1 V. When the input X of +0.5 V is supplied to the FET 364, the drain-source resistance $R_{DS}$ of each of the FET's 354 and 364 becomes one-half of the resistance R1 or R2, and as a result, the gain of the operational amplifier 355 becomes −2 thereby to produce an output E of −2 V. When the input X of +1 V, the input Z of −0.5 V and the input Y of +1 V are supplied, the drain-source resistances $R_{DS}$ of each are double the resistance R1 or R2. Accordingly, the gain of the operational amplified 355 becomes ½ thereby to produce an output E of −0.5 V.

The circuit parameters of the correction circuit 35 are as follows:

FETs 354 and 364: 2N4393
Diode 366: IS1588
Operational amplifiers 356 and 365: TL082 (Dual)
Input voltage of Y: −2 to +2 V
Input voltage of X: 0 to +2 V
Input voltage of Z: −10 to 0 V
Resistance R1 and R2: 68 kΩ
Resistance of resistors 351 and 361: 910 Ω
Resistance of resistors 352 and 362: 100 Ω
Resistance of resistors 353, 363, 357, and 367: 600 kΩ

Figure 11:
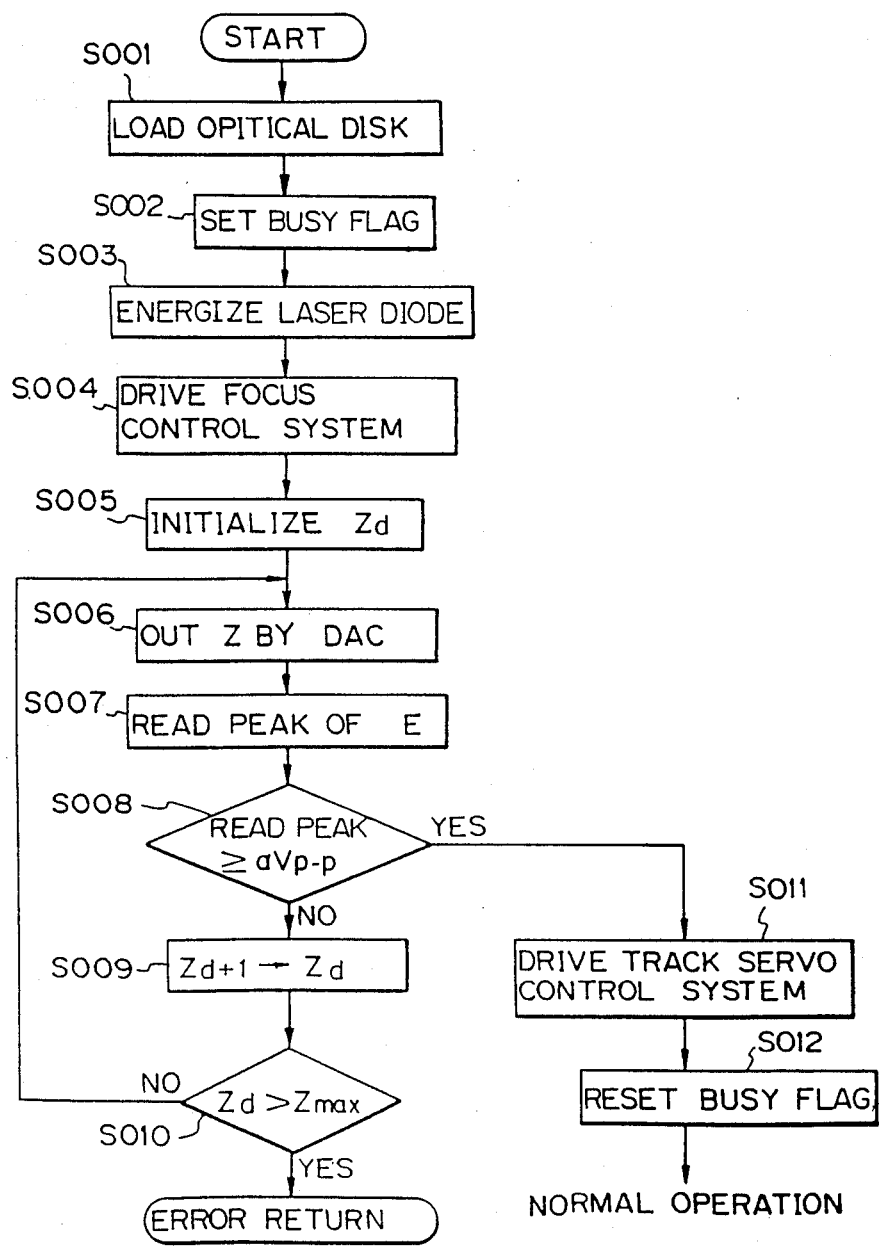
FIG. 11 is a flow chart explaining the operation of the tracking servo control system shown in FIG. 9.

Referring to FIG. 11, the operation of the tracking servo control system shown in FIG. 9 will be described. The tracking signal adjustment is carried out upon every start up or restart of the optical disk system or upon every change of an optical disk, and prior to the start of a normal tracking servo control operation.

When the power is made ON or a restart is initiated, the MPU 6 starts operation.

Steps 001 and 002 (S001 and S002 in FIG. 11)

When a new optical disk is loaded, the MPU 6 sets a busy flag to inhibit the issue of a command from a host controller (not shown).

Steps 003 and 004 (S003 and S004)

The MPU 6 energizes the laser diode in the light source 24 shown in FIG. 1, thereby to emit light from the light source 24 (S003). The MPU 6 also drives the focus servo control system to focus the beam spot on a track on the optical disk by moving the object lens 20 by means of the focus actuator 22 shown in FIG. 1 (S004). The four-division light receiver 26 receives the reflected light beam.

Step 005 (S005)

The MPU 6 initializes a correction factor Zd. An initial value of the correction factor Zd may be zero.

Steps 006 to 008 (S006 to S008)

The MPU 6 outputs the correction factor Zd in digital form to the DAC 36 (S006). The DAC 36 outputs an analog correction factor Z corresponding to the digital correction factor Zd to the correction circuit 35. The MPU 6 reads the peak of E (i.e., the automatic gain controlled and corrected value E=Y·Z/X, where Y.Z is the corrected version of (i.e., Y.Z=CTES) and thus corresponds to the tracking error signal Y (i.e., Y=TES) through the peak detection circuit 50 and the ADC 51 (S007). After the peak read operations, the MPU 6 outputs a reset pulse RESET to the peak detection circuit 50 to clear the held peak value.

Figure 12A:
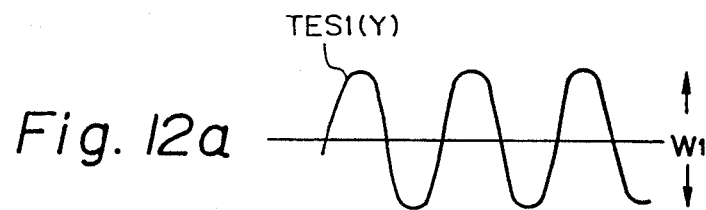
FIGS. 12a to 12c are graphs explaining the operation of the tracking servo control system shown in FIG. 9.
Figure 12B:
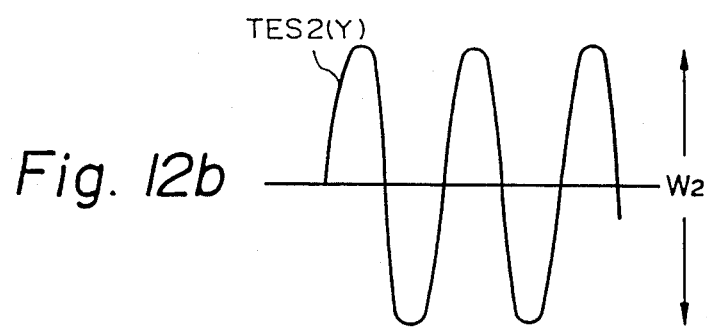

FIGS. 12a and 12b show tracking error signals TES1 (Y) and TES2 (Y) of different groove shapes. In FIGS. 12a and 12b, intersections of the waveforms and the horizontal axis indicate centers of the grooves. Frequencies of the tracking error signals may be approximately 1 ms, and accordingly, the above peak read and reset can be carried out within 1 ms.

The tracking error signal TES obtained at the operational amplifier 30 is varied in response to a variation of the shape of the grooves, as shown in FIGS. 12a and 12b. The variation of the tracking error signal TES is corrected at the correction circuit 35 which produces the corrected tracking error signal CTES having a same amplitude Ws regardless of a variation in the amplitudes, as shown by $W_1$ in FIG. 12a and $W_2$ in FIG. 12b, by suitably adjusting the correction factor Zd.

The MPU 6 checks whether or not the read peak has reached or exceeded a predetermined peak to peak voltage $aV_{P-P}$, for example $aV_{P-P}=1.0$ V (S008).

Steps 008 to 010 (S008 to S010)

When the read peak has not reached or exceeded the predetermined peak to peak voltage $aV_{P-P}$, the MPU 6 increases the correction factor Zd by one (S009). The MPU 6 changes the control to step 006 (S006) and the operation of steps 006 to 009 (S006 to S010) is continued until the read peak reaches or exceeds the predetermined peak to peak voltage $aV_{P-P}$, unless the correction factor Zd exceeds a maximum value Zmax (S010). If the correction factor Zd exceeds the maximum value Zmax, the MPU 6 terminates the tracking signal adjustment.

Steps 008, 011 and 012 (S008, S011 and S012)

When the read peak reaches or exceeds the predetermined peak to peak voltage $aV_{AVP-P}$, the MPU 6 holds the correction factor Zd, and as a result, the DAC 36 continues supplying the analog output Z, corresponding to the held correction factor Zd, to the correction circuit 35. The amplitude normalized and corrected circuit 35 then calculates the correction tracking error signal E in accordance with the equation (3) by using the correction factor Z from the DAC 36. The MPU 6 drives the tracking servo control system (S011). Thereafter, the MPU 6 resets the busy flag to permit issuance of a command from the host controller (S012), and the normal operation of the optical disk system can be carried out.

When the MPU 6 receives a seek command from the host controller, first a seek control is carried out, and then the tracking servo control is carried by using the normalized value E of the correction tracking error signal CTES. The amplitude of the correction tracking error signal is normalized regardless of the shape of the grooves of the optical disk, and accordingly, the tracking servo control can be achieved safely and accurately regardless of the type of optical disk.

In FIG. 11, the initial value of the Zd can be set to a predetermined value greater than zero to speed-up the track signal adjustment.

Also, the initial value of the Zd can be set to a predetermined value equal to a previously obtained correction factor. Also, the correction factor Zd can be increased or decreased by one in response to the value of the read peak.

Figure 12C:
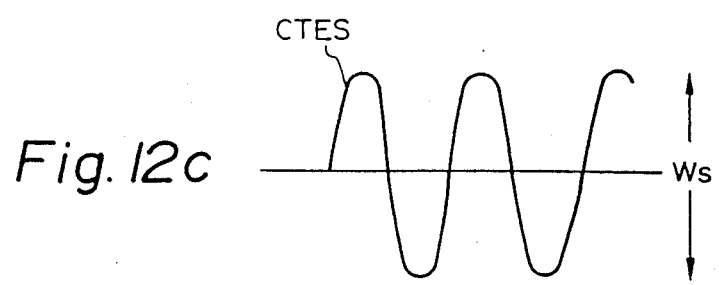

When the final correction amplitude Ws shown in FIG. 12c is constant and is already known, the correction factor Zd can be formed by the following formula:

$$Zd = \frac{W}{Ws} \quad (4)$$

where, W denotes the value of the read peak.

The above tracking signal adjustment can be carried out not only at the start-up time, the restart time, and the loading of the optical disk, as described above, but also periodically and/or upon a change from a read to a write operation and vice versa.

In the above embodiment, a reflection type optical disk as shown in FIGS. 6a and 7a has been discussed, but the present invention can be also applied to a transparent type optical disk by installing a light receiving system above the optical disk 1 shown in FIG. 1.

The four-division light receiver 26 as shown in FIGS. 3a to 3c is described. However, the present invention can be achieved by using any other light receiver, for generating source signals used for a tracking error signal TES and a sum of the source signals, such as a two-division light receiver (not shown).

Also, the functions of the light receiver 25 for generating the RF signal and the light receiver 26 as shown in FIG. 1 can be in a single light receiver used in common for both functions.

In FIG. 1, the track actuator 21 can move both the object lens 20 and the optical system 23, instead of just providing the horizontal movement of the object lens 20.

Many widely different embodiments of the present invention may be constructed without departing from the spirit and scope of the present invention. It should be understood that the present invention is not restricted to the specific embodiments described above, except as defined in the appended claims.

What is claimed is:

1. An optical disk system comprising:
   means for supporting an optical disk having a plurality of grooves for storing data;
   an optical head associated with the supporting means and comprising a source of light, an object lens for focussing light received thereby as a light beam spot onto a selected groove of an optical disk supported by the supporting means, a light receiver, an optical system associated with the object lens, the source of light and the light receiver, the optical system directing light emitted by the light source to the object lens and receiving an image of the light beam spot reflected from the optical disk and directing same to the light receiver, the light receiver producing an output signal indicative of the reflected image of the light beam spot, and focussing and tracking actuators associated with the object lens, the focussing actuator being controllable for moving the object lens and correspondingly the focussed light beam spot produced thereby relatively to the optical disk in a path perpendicular to the disk surface and the tracking actuator being controllable for moving the object lens and correspondingly the focussed light beam spot produced thereby in a lateral direction parallel to the surface of the optical disk and transversely to the grooves therein; and
   control means, comprising a focussing servo portion and a tracking servo portion, each responsive to the output signal of the light receiver, for producing and supplying corresponding focussing and tracking control outputs respectively to the focussing actuator for moving the object lens to focus the light beam spot on the surface of the optical disk and to the tracking actuator for moving the object lens to position the focussed light beam spot relative to the center of a selected groove;
   the tracking servo portion of the control means comprising first and second circuit means, each responsive to the output signal of the light receiver, respectively for generating a tracking error signal:Y and a sum signal:X, and a correction circuit for calculating the value of and producing the output:

$$E = \frac{Y \cdot Z}{X}$$

where Z is a correction factor, means for peak detecting the calculated value:E output by the correction circuit, and means for adjusting the correction factor:Z to normalize the calculated value:E in accordance with the peak detected value:E, and a circuit for phase-adjusting the normalized, calculated value:E.

2. An optical system according the claim 1, wherein the adjusting means adjusts the correction factor:Z to normalize the calculated value:E output by the correction circuit, by successively increasing or decreasing the value of the correction factor:Z until the detected peak of the calculated value:E lies within a predetermined range.

3. An optical system according to claim 1, wherein the adjusting means adjusts the correction factor:Z to normalize the calculated value:E calculated by the correction circuit, by calculating the value:Z=W/Ws, where W is the detected peak value of the calculated value:E and Ws is a predetermined, normalized amplitude of the output signal of the light receiver.

4. An optical system according the claim 1, wherein the control means, in succession, initially energizes the focussing servo portion thereof for driving the tracking actuator to focus the light beam spot on the surface of the optical disk and, following completion of such focussing, energizes the focussing servo portion thereof to achieve normalization of the calculated value:E, prior to producing and supplying the tracking control output to the tracking actuator for moving the object lens to position the focussed light beam spot at the center of the selected groove.

5. An optical disk system according to claim 1, wherein the adjusting means adjusts the correction factor:Z periodically during normal operation of the optical disk system.

6. An optical disk system according to claim 1, wherein:
   the first, tracking error signal generation circuit, the second, sum signal generation circuit and the correction circuit comprise analog circuits;
   the tracking servo portion produces a digital correction factor:Zd;
   the adjusting means comprises means for adjusting the digital correction factor:Zd and an analog-to-digital converter which receives the adjusted, digital correction factor:Zd and produces an analog, adjusted correction factor:Z supplied thereby to the correction circuit;

the peak detecting means comprises an analog peak detection circuit which receives and peak detects the analog output E from the correction circuit and holds an analog, maximum peak detected value of E, and an analog-to-digital converter circuit which receives and converts the analog, maximum peak detected value of E to a digital value supplied thereby to the correction factor adjusting means; and the control means further comprises means for resetting the peak detection means.

7. An optical disk system according to claim 6, wherein the analog correction circuit comprises:

first and second field effect transistors each having input, output, and gate terminals, the gate terminals being connected at a common connection point and the first and second field effect transistors each having a variable source-drain resistances responsive to the value of a signal applied to the gate terminal thereof and the source-drain resistances of the first and second field effect transistor being of a common value when signals of the same value are applied to the respective gate terminals thereof, the tracking error signal:Y and the sum light signal:X respectively being applied to the input terminals of the first and second field effect transistors;

first and second operational amplifiers having common operational characteristics and each having an inverted input terminal, a non-inverted input terminal, and an output terminal, the non-inverted input terminals of each being grounded;

the inverted input terminal of the second operational amplifier being connected to the output terminal of the second field effect transistor, and the output terminal thereof being connected to the common connection point of the gate terminals of the first and second field effect transistors;

an input resistor having a predetermined resistance value and first and second terminals, the correction factor:Z being applied to the first terminal thereof and the second terminal thereof being connected to the output terminal of the second field effect transistor and correspondingly to the inverted input terminal of the second operational amplifier;

the inverted input terminal of the first operational amplifier being connected to the output terminal of the first field effect transistor; and a feedback resistor having the same predetermined resistance value of the input resistor and first and second terminals, connected at its first and second terminals respectively to the output and inverted input terminals of the first operational amplifier.

8. An optical disk system according to claim 1, wherein the light receiver comprises a four-division light receiver.

9. An optical disk system according to claim 1, wherein the light receiver comprises a two-division light receiver.

10. An optical disk system according to claim 1, wherein the optical disk is provided with a plurality of reflection type semi V-shaped grooves.

11. An optical disk system according to claim 1, wherein the optical disk is provided with a plurality of transparent type semi V-shaped grooves.

12. An optical disk system according to claim 1, wherein the optical disk is provided with a plurality of reflection type U-shaped grooves.

13. An optical disk system according to claim 1, wherein the optical disk is provided with a plurality of transparent type U-shaped grooves.

14. An optical disk system according to claim 1, wherein the control means comprises a microprocessor unit.

15. A method for controlling the focussing and tracking of a light beam spot relative to the center of a selected groove of an optical disk having plural such grooves therein for storing data and employing an object lens for focussing light received thereby from a source of light to form the light beam spot, the object lens being selectively movable perpendicular to the surface of the optical disk for positioning the focussed light beam spot on the surface of the disk and further being controllably removable in a lateral direction parallel to the surface of the optical disk and transversely to the grooves therein, comprising:

initially responding to an image of the light beam spot as reflected from the surface of the disk for moving the object lens to position the focussed light beam spot on the surface of the disk;

further responding to the reflected image of the light beam spot as focussed on the surface of the disk for producing a tracking error signal:Y and a sum signal:X and calculating the value:

$$E = \frac{Y \cdot Z}{X}$$

where Z is a correction factor:

peak detecting the calculated value:E and adjusting the correction factor:Z to normalize the calculated value:E in accordance with the peak detected value of E;

phase-adjusting the normalized, calculated value:E; and moving the object lens laterally of the surface of the optical disk and transversely to the selected groove in accordance with the normalized and phase-adjusted, calculated value:E for positioning the focussed light beam spot at the center of the selected groove.

16. The method according to claim 15, further comprising adjusting the correction factor:Z to normalize the calculated value:E by successively increasing or decreasing the value of the correction factor:Z until the detected peak of the calculated value:E lies within a predetermined range.

17. The method according to claim 15, further comprising:

adjusting the correction factor:Z to normalize the calculated value:E by calculating the value:Z=W/Ws, where W is the detected peak value of the calculated value:E and Ws is a predetermined, normalized amplitude of the reflected image of the light beam spot focussed on the surface of the disk.

18. The method according to claim 15, further comprising:

adjusting the correction factor:Z periodically during normal operation of the optical disk system for recording data in or reading recorded data from the grooves of the optical disk.

* * * * *

UNITED STATES PATENT AND TRADEMARK OFFICE
CERTIFICATE OF CORRECTION

PATENT NO. : 4,977,551
DATED : Dec. 11, 1990
INVENTOR(S) : MINAMI et al.

It is certified that error appears in the above-identified patent and that said Letters Patent is hereby corrected as shown below:

```
Col. 1, line 14, delete "a";
        line 51, change "disks" to --disk--, and change
"adjust" to --adjusts--;
        line 58, delete "a" (second occurrence).

Col. 2, line 53, change "track" to --tracking--.

Col. 3, line 24, change "a" (first occurrence) to --the--;
        line 26, change "FIGS." to --FIG.--;
        line 42, delete ",".

Col. 5, line 10, change "track" to --tracking--;
        line 19, after "FIG. 5" insert --,--;
        line 30, change "track" to --tracking--.

Col. 6, line 19, change "track" to --tracking--.

Col. 7, line 16, change "½" to -- -½ --;
        line 65, change "Y.Z" to --Y·Z--;
        line 68, change "operations" to --operation--.
```

UNITED STATES PATENT AND TRADEMARK OFFICE
CERTIFICATE OF CORRECTION

PATENT NO. : 4,977,551
DATED : Dec. 11, 1990
INVENTOR(S) : MINAMI et al.

Page 2 of 2

It is certified that error appears in the above-identified patent and that said Letters Patent is hereby corrected as shown below:

Col. 8, line 28, change "S010" to --S009--;

line 38, change "aV$_{AVP-P}$" to --a$V_{p-p}$--;
line 61, change "track" to --tracking--.

Col. 9, line 27, change "track" to --tracking--.

Signed and Sealed this

Twenty-second Day of September, 1992

Attest:

DOUGLAS B. COMER

*Attesting Officer*   *Acting Commissioner of Patents and Trademarks*